US006917936B2

(12) United States Patent
Cancedda

(10) Patent No.: US 6,917,936 B2
(45) Date of Patent: Jul. 12, 2005

(54) METHOD AND APPARATUS FOR MEASURING SIMILARITY BETWEEN DOCUMENTS

(75) Inventor: Nicola Cancedda, Grenoble (FR)

(73) Assignee: Xerox Corporation, Stamford, CT (US)

( * ) Notice: Subject to any disclaimer, the term of this patent is extended or adjusted under 35 U.S.C. 154(b) by 201 days.

(21) Appl. No.: 10/321,869

(22) Filed: Dec. 18, 2002

(65) Prior Publication Data

US 2004/0128288 A1 Jul. 1, 2004

(51) Int. Cl.⁷ .............................................. G06F 17/30
(52) U.S. Cl. .................................. 707/4; 707/5; 707/6
(58) Field of Search .......................... 707/1–100; 704/9, 704/10; 715/513

(56) References Cited

U.S. PATENT DOCUMENTS 5,524,240 A * 6/1996 Barbara et al. ................. 707/3
6,338,057 B1 * 1/2002 Weeks ............................ 707/3

OTHER PUBLICATIONS

David Haussler, "Convolution Kernels on Discrete Structures", in Technical Report USCS–CRL99–10, Department of Computer Science, University of California at Santa Cruz, 1999.

Christina Leslie, Eleazar Eskin and William Stafford Noble "The Spectrum Kernel: A String Kernel for SVM Protein Classification", in Proceedings of the Pacific Symposium on Biocomputing, Kauai, Hawaii, 2002.

Huma Lodhi, John Shawe–Taylor, Nello Cristianini, and Christopher J. C. H. Watkins, "Text classification using string kernels", in NeuroCOLT2 Technical Report Series NC–TR–2000–079, 2000.

Huma Lodhi, John Shawe–Taylor, Nello Cristianini, and Chrstopher J. C. H. Watkins, "Text classification using string kernels", in Advances in Neural Information Processing Systems, pp. 563–569, Cambridge, MA, 2001.

Huma Lodhi, Craig Saunders, John Shawe–Taylor, Nello Cristianini, and Chris Watkins, "Text classification using string kernels", in Journal of Machine Learning Research, 2:419–444, Feb. 2002.

Chris Watkins, "Dynamic Alignment Kernels", in Technical Report CSD–TR–98–11, Department of Computer Science, Royal Holloway University of London, Jan. 1999.

* cited by examiner

Primary Examiner—Charles Rones
Assistant Examiner—Neveen Abel-Jalil

(57) ABSTRACT

A measure of similarity between a first sequence of symbols and a second sequence of symbols is computed. Memory is allocated for a computational unit for storing values that are computed using a recursive formulation that computes the measure of similarity based on matching subsequences of symbols between the first sequence of symbols and the second sequence of symbols. A processor computes for the computational unit the values for the measure of similarity using the recursive formulation within which functions are computed using nested loops. The measure of similarity is output by the computational unit to an information processing application.

21 Claims, 7 Drawing Sheets

Direct [
Input:
  $s, t \in \Sigma+$    # s & t are two sequences of symbols
  $\lambda \in [0,1]$    # decay factor
  $N \in \aleph +$    # subsequence length
Output:
  $K_N(s,t)$    # measure of similarity
]
{

$K'_0(i,j) = 1, 0 \leq i \leq |s|, 0 \leq j \leq |t|$
$K'_n(n-1,j) = 0, 1 \leq n \leq N, n-1 \leq j \leq |t|$   } Initialize base values
$K''_n(i,n-1) = 0, 1 \leq n \leq N, n-1 \leq i \leq |s|$   of K, K', and K"
$K_n(n-1,j) = 0, 1 \leq n \leq N, n-1 \leq j \leq |t|$ for $n = 1$ to $N-1$ # for increasing subsequence length n
 for $i = n$ to $|s|$ # for increasing prefixes s
  for $j = n$ to $|t|$ { # for increasing prefixes t
   if $s_i = t_j$ then
    $K''_n(i,j) = \lambda K''_n(i,j-1) + \lambda^2 K'_{n-1}(i-1,j-1)$
   else
    $K''_n(i,j) = \lambda K''_n(i,j-1)$
   $K'_n(i,j) = \lambda K'_n(i-1,j) + K''_n(i,j)$
  }
for $i = n$ to $|s|$ { # compute K
 $\overline{K} = 0$
 for $j = 1$ to $|t|$
  if $s_i = t_j$ then
   $\overline{K} = \overline{K} + K'_{N-1}(i-1,j)$
 $K_N(i,|t|) = K_N(i-1,|t|) + \lambda^2 \overline{K}$
}
}

*FIG. 5*

Diagonal [
Input:
    $s, t \in \Sigma+$      # s & t are two sequences of symbols
    $\lambda \in [0,1]$      # decay factor
    $N \in \aleph+$      # subsequence length
Output:
    $K_N(s)$      # measure of similarity
] {

$K'_0(j) = 1, 0 \leq j \leq |t|$     ⎫ — 802
$K'_n(j) = 0, 1 \leq n \leq N, 0 \leq j \leq |t|$     ⎬ Initialize base values
$K''_n(i) = 0, 1 \leq n \leq N, n-1 < I < |s|$     ⎨ of K, K', and K"
$K_n(j) = 0, 1 \leq n \leq N, n-1 \leq j \leq |s|$     ⎭ for $l=2$ to $|s|+|t|$ { # for increasing sums of prefix lengths s and t
    for $h=1$ to $l-1$ { # for increasing prefixes s
        if $h \leq |s|$ and $l-h \leq |t|$ and $s_h = t_{j-h}$ then
            $K_1(h) = K_1(h) + 1$
        for $n=1$ to $N-1$ { # for increasing subsequence length n
            $i = h + n - 1$
            $j = l - h + n - 1$
            if $i \leq |s|$ and $j \leq |t|$ then {
                $K''_n(i) = \lambda K''_n(i)$      ← 814
                if $s_i = t_j$ then
                    $K''_n(i) = K''_n(i) + \lambda^2 K'_{n-1}(j-1)$      ← 816
                $K'_n(j) = \lambda K'_n(j) + K''_n(i)$      ← 818
                if $i < |s|$ and $j < |t|$ and $s_i = t_j$ then    ⎫ 820
                    $K_{n+1}(i+1) = K_{n+1}(i+1) + K'_n(j)$    ⎭
            }
        } ← 810
    } ← 808
} ← 806
for $i=1$ to $|s|$
    $K_N(i) = \lambda^2 K_N(i) + K_N(i-1)$      } 812
}

*FIG. 8*

METHOD AND APPARATUS FOR MEASURING SIMILARITY BETWEEN DOCUMENTS

BACKGROUND OF INVENTION

The present invention relates generally to document information retrieval, and more particularly to a method and apparatus for computing a measure of similarity between arbitrary sequences of symbols.

An important aspect of document information retrieval, classification, categorization, clustering, routing, cross-lingual information retrieval, and filtering is the computation of a measure of similarity between two documents, each of which can be reduced to an arbitrary sequence of symbols. Most techniques for computing document similarity require the computation of pair wise similarities over large sets of documents. Experiments have shown that the adopted similarity measure greatly influences performance of information retrieval systems.

One similarity measure known as the "string kernel" (also referred to herein as the "sequence kernel") is disclosed by: Chris Watkins, in "Dynamic Alignment Kernels", Technical Report CSD-TR-98-11, Department of Computer Science, Royal Holloway University of London, 1999; Huma Lodhi, Nello Cristianini, John Shawe-Taylor and Chris Watkins, in "Text Classification Using String Kernels", Advances in Neural Information Processing Systems 13, the MIT Press, pp. 563–569, 2001; and Huma Lodhi, Craig Saunders, John Shawe-Taylor, Nello Cristianini, Chris Watkins, in "Text classification using string kernels", Journal of Machine Learning Research, 2:419–444, 2002, which are all incorporated herein by reference.

Generally, the string kernel is a similarity measure between two sequences of symbols over the same alphabet, where similarity is assessed as the number of occurrences of (possibly noncontiguous) subsequences shared by two sequences of symbols; the more substrings in common, the greater the measure of similarity between the two sequences of symbols. The string kernel may be used to evaluate the similarity between different types of sequences of symbols (or "symbolic data") such as sequences of: characters, words, lemmas, or other predefined sets of terms (e.g., amino acids or DNA bases).

More specifically, the string kernel is referred to herein as a function which returns the dot product of feature vectors of two inputs strings. Feature vectors defined in a vector space is referred to as a "feature space". The feature space of the string kernel is the space of all subsequences of length "n" characters in the input strings. The subsequences of characters may be contiguous or noncontiguous in the input strings. However, noncontiguous occurrences are penalized according to the number of gaps they contain.

A limitation of existing implementations for computing the string kernel is the memory required to carry out the computation. Known implementations for computing the string kernel of two sequences of symbols rely on a dynamic programming technique that requires computing and storing a large number of intermediate results. Such known implementations have used a technique which uses a variable (i.e., a component in a large array) for storing each intermediate result. These intermediate results require memory storage that is proportional in size to the product of the lengths of the sequences being compared.

Since existing techniques for computing this measure of similarity between arbitrary sequences of symbols require a storage usage proportional to the product of the lengths of the sequences being compared, it would be advantageous therefore to provide a technique for computing a string kernel that reduces the storage usage requirement of existing techniques to enable the computation of the string kernel for longer sequences of symbols.

SUMMARY OF INVENTION

In accordance with the invention, there is provided a method, apparatus and article of manufacture therefor, for computing a measure of similarity between two sequences of symbols known as the string kernel. In accordance with one aspect of the invention, the geometry of the data dependencies in matrices used to represent the intermediate results of the similarity computation (i.e., what component in the matrices is needed to compute what other component in the matrices) is selected that allows most intermediate results stored in a memory of a computational unit to be deleted from its memory shortly after their computation by the computational unit.

In accordance with this aspect of the invention, the selected geometry defines an order in which the computational unit computes intermediate values in a "diagonal order". The computation using the diagonal order requires that only those values which are on the diagonal itself be stored in the memory of the computational unit, thereby permitting the computation of the string kernel using an amount of memory that is proportional to the sum of the lengths of the sequences of symbols for which the similarity measure is computed. Advantageously, the diagonal computation order for computing intermediate results of the string kernel decreases the memory requirements for carrying out the computation of the string kernel between sequences of symbols of any given length.

In accordance with another aspect of the invention, there is provided a dynamic programming method, apparatus and article of manufacture therefor, for computing a measure of similarity between a first sequence of symbols and a second sequence of symbols. Memory is allocated for a computational unit for storing values that are computed using a recursive formulation that computes the measure of similarity based on matching subsequences between the first sequence of symbols and the second sequence of symbols. A processor computes for the computational unit the values for the measure of similarity using the recursive formulation within which functions are computed using nested loops that include: an outer loop that ranges over increasing sums of prefix lengths of the first sequence of symbols and the second sequence of symbols, a middle loop that ranges over increasing prefixes of the first sequence of symbols, for each sum of prefix lengths of the outer loop, and an inner loop that ranges over increasing subsequence lengths, for each prefix of the first sequence of symbols of the middle loop. The measure of similarity is output by the computational unit to an information processing application.

BRIEF DESCRIPTION OF DRAWINGS

These and other aspects of the invention will become apparent from the following description read in conjunction with the accompanying drawings wherein the same reference numerals have been applied to like parts and in which:

FIG. 5 sets forth pseudo code depicting computational operations of a direct method for performing the recursive formulation of the string kernel;

FIG. 8 sets forth pseudo code depicting computational operations of a diagonal method for performing the recursive computation of the string kernel.

DETAILED DESCRIPTION OF INVENTION

A. Operating Environment

Figure 1:
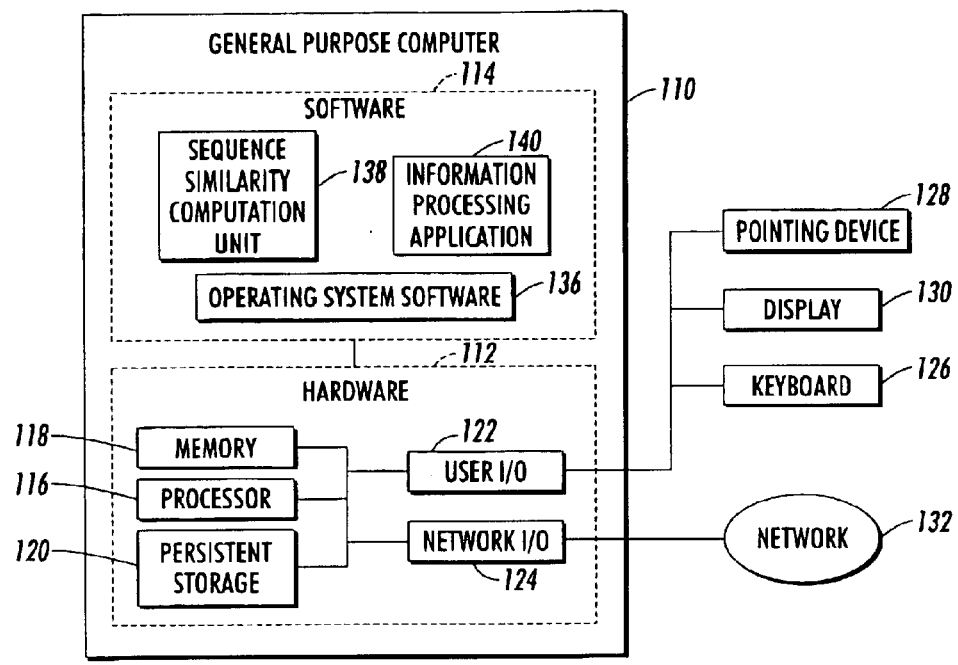
FIG. 1 illustrates a general purpose computer for carrying out the present invention.

FIG. 1 illustrates a general purpose computer 110 for carrying out the present invention. The general purpose computer 110 includes hardware 112 and software 114. The hardware 112 is made up of a processor (i.e., CPU) 116, memory 118 (ROM, RAM, etc.), persistent storage 120 (e.g., CD-ROM, hard drive, floppy drive, tape drive, etc.), user I/O 122, and network I/O 124. The user I/O 122 can include a keyboard 126, a pointing device 128 (e.g., pointing stick, mouse, etc.), and the display 130. The network I/O 124 may for example be coupled to a network 132 such as the Internet. The software 114 of the general purpose computer 110 includes an operating system 136, a sequence similarity computation unit 138 and an information processing application 140.

Figure 2:
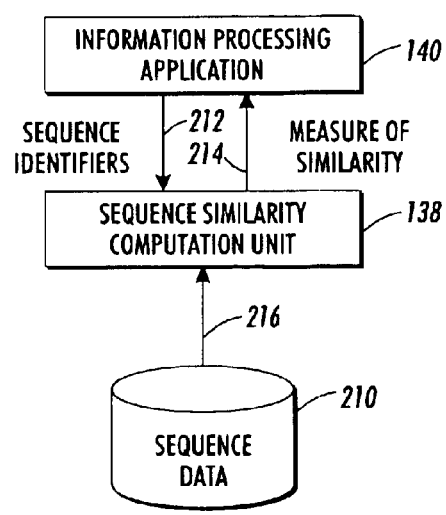
FIG. 2 illustrates one embodiment in which the information processing application and the sequence similarity computation unit shown in FIG. 1 operate together.

FIG. 2 illustrates one embodiment in which the information processing application 140 and the sequence similarity computation unit 138 operate together. The information processing application 140 identifies textual content stored in sequence data memory 210 for which a measure of similarity is desired. The sequence similarity computation unit 138 receives as input at 212 identifiers of two sequences of symbol data. The sequence similarity computation unit 138 computes, using processor 116 and memory 118, for the information processing application 140 a measure of similarity at 214 of the two sequences of symbols from the memory 210 at 216. The information processing application 140 may then use the measure of similarity 214 for information clustering, classification, cross-lingual information retrieval, routing, text comparison, and/or filtering.

In an alternate embodiment, the information processing application 140 and the sequence similarity computation unit 138 are embedded together in one or more software modules. In yet another embodiment, the information processing application 140 operates on the general purpose computer 110 that transmits the measure of similarity 214 over the network 132 to another general purpose computer, also coupled to the network 132, on which the information processing application 140 operates.

B. Mathematical Framework of the String Kernel

In accordance with the invention, the sequence similarity computation unit 138 computes for given sequence data 216 a measure of similarity 214 using the string kernel. This section sets forth basic notations and definitions for the mathematical framework of the string kernel.

Let $\Sigma$ be a finite alphabet, and let $s = s_1 s_2 \ldots s_{|s|}$ be a sequence of symbols over such alphabet (i.e., $s_i \in \Sigma$, $1 \leq i \leq |s|$). Let $i = [i_1, i_2, \ldots, i_n]$, with $1 \leq i_1 < i_2 < \ldots < i_n \leq |s|$, be a subset of the indices in s, where $s[i] \in \Sigma^n$ identifies the contiguous or noncontiguous subsequence $s_{i_1}, s_{i_2}, \ldots, s_{i_n}$ of symbols. Also, let $l(i)$ be the value $i_n - i_1 + 1$ (i.e., the length of the window in s spanned by $s[i]$).

Computing a string kernel amounts to performing an inner product in a feature space of all possible subsequences of length n, with one dimension for each subsequence $u \in \Sigma^n$, where the value associated with the feature u is defined by:

$$\phi_u(s) = \Sigma_{i:u=s[i]} \lambda^{l(i)},$$

where $\lambda$ is a real number between zero and one indicating the decay factor for each gap in subsequence occurrences. The decay factor $\lambda$ is used to penalize noncontiguous subsequences. For example if $\lambda$ is given the value one, noncontiguous subsequences with gaps between matching symbols are taken into account with no penalty when computing the value of the similarity. However, if $\lambda$ is given the value of 0.5, then gap symbols (i.e., symbols in noncontiguous subsequences that create gaps between matching symbols) contribute to the value of the similarity by dividing the contribution of the match they appear in by two each.

The string kernel (i.e., similarity $K_n$ where n is a fixed positive integer) of two strings s and t over the finite alphabet $\Sigma$ is defined as:

$$K_n(s,t) = \sum_{u \in \Sigma^n} \phi_u(s) \cdot \phi_u(t) \qquad [1]$$

$$= \sum_{u \in \Sigma^n} \sum_{i:u=s[i]} \lambda^{l(i)} \sum_{j:u=s[j]} \lambda^{l(j)}$$

$$= \sum_{u \in \Sigma^n} \sum_{i:u=s[i]} \sum_{j:u=t[j]} \lambda^{l(i)+l(j)}$$

B.1 Example Computation of the String Kernel

Intuitively, the computation of the string kernel involves the matching of all possible subsequences of "n" symbols, with each occurrence "discounted" according to the size of the window that it spans. Consider for example the alphabet $\Sigma = \{A, C, G, T\}$, and the two elementary sequences:

s=CATG and t=ACATT.

In this example, the similarity between the sequence s and t is measured for all subsequences (or features) of length n=3. The nonzero subsequences u of the vectors for s and t in the feature space would then be given as set forth in Table 1.

TABLE 1

| u | s | t |
|---|---|---|
| AAT | 0 | $\lambda^4 + \lambda^5$ |
| ACA | 0 | $\lambda^3$ |
| ACT | 0 | $\lambda^4 + \lambda^5$ |
| ATG | $\lambda^3$ | 0 |
| ATT | 0 | $\lambda^3 + \lambda^5$ |
| CAG | $\lambda^4$ | 0 |
| CAT | $\lambda^3$ | $\lambda^3 + \lambda^4$ |
| CTG | $\lambda^4$ | 0 |
| CTT | 0 | $\lambda^4$ |

As shown in Table 1, the only subsequence for which both sequence s and t have a non-null value is CAT. More specifically, the value of the feature u=AAT for sequence t=ACATT is $\lambda^4 + \lambda^5$ because there are two occurrences of AAT in ACATT. The first occurrence of AAT spans a window of width four (i.e., first, third, and fourth symbols) and the second occurrence of AAT spans a window of width five (i.e., first, third, and fifth symbols). The similarity score is then obtained by multiplying the corresponding components of the subsequences in the two sequence s and t and then summing the result, as given by:

$$K_3(CATG, ACATT) = \lambda^3(\lambda^3 + \lambda^4).$$

B.2 Computation of the String Kernel Using Dynamic Programming

A direct computation of all the terms in the nested sum in the equation [1] of the string kernel becomes impractical even for small values of n. There is, however, a recursive formulation that leads to a more efficient dynamic-programming implementation as disclosed by Lodhi et al. in the publications cited above and incorporated herein by reference.

The recursive formulation is based on the following reasoning. If the value of the string kernel for two string s and t is known, then the following two observations can be made regarding the computation of the value of the string kernel sx and t, for some $x \in \Sigma$ (where sx is the sequence obtained by appending the symbol x to the end of the sequence of symbols s):

(1) all subsequences common to s and t are also common to sx and t; and (2) all new matching subsequences ending in x which occur in string t and whose (n−1)-symbol prefix occur in string s (possibly noncontiguously) must be considered to compute the value of the string kernel sx and t.

Figure 3:
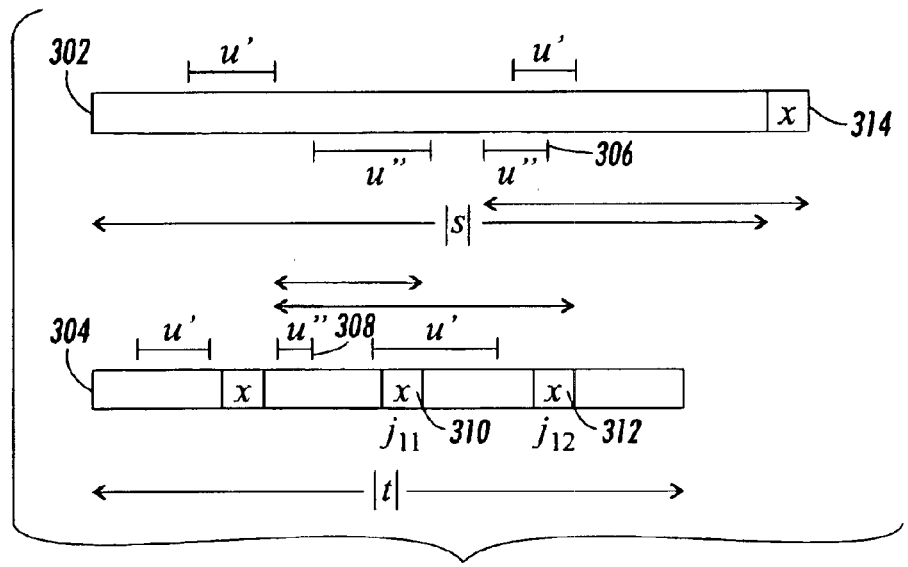
FIG. 3 illustrates contributions from different occurrences of common subsequences in strings s and t.

FIG. 3 illustrates contributions from different occurrences of common subsequences in strings s and t, identified as 302 and 304 respectively. More specifically, FIG. 3 illustrates the observation (2) above in which u' and u" are two distinct subsequences of length n−1 that occur in both strings s and t. As occurrences of u' and u" in strings s and t can contain gaps, each occurrence of u' and u" spans, in principle, a window of different length as illustrated in FIG. 3. Focusing on the occurrence of u" in s identified at 306, if $i^a$ is the set of indices of the occurrence of u" in s (i.e., if u"=s[$i^a$]), then the length of the window l($i^a$) spanned by the occurrence of u" in s identified at 306 is given by l($i^a$)=$i_{n-1}^a - i_1^a + 1$.

Together with the occurrence of u" in s identified at 306, the occurrence of u" in t identified at 308 gives rise to two new matches of length n for the subsequence u"x between sx and t, due to the occurrence of u" in t identified at 308 and the occurrences of x in t at 310 and 312. The two new matches (i.e., 306 concatenated to 314 matching 308 concatenated to 310, and 306 concatenated to 314 matching 308 concatenated to 312) contribute to the string kernel (defined at [1]) according to their respective lengths:

$$\lambda^2(\lambda^{|s|-i_1^a+1}\lambda^{j_n-j_1^b} + \lambda^{|s|-i_1^a+1}\lambda^{j_2-j_1^b}),$$

where $j^b$ is the set of indices of u" in t identified at 308, and $j_{t1}$ and $j_{t2}$ are the indices of the occurrences of x in t at 310 and 312. Note that the $\lambda^2$ factor is the contribution of the matching x themselves and the rest is the contribution of the occurrences of u" and of the gaps to the string kernel. Similar inputs will be given by all occurrences of u' and u" and all other subsequences of length n−1 in the two strings s and t.

Thus, the string kernel in equation [1] can be rewritten for sx and t as:

$$K_n(sx, t) = K_n(s, t) + \sum_{u \in \Sigma^n} \sum_{i:s[i]=u} \sum_{j:t_j=x} \sum_{1:t[1]=u, l_{n-1}<j} \lambda^{|s|+1-i_1+1}\lambda^{j-l_1+1} \quad [2]$$

$$= K_n(s, t) + \sum_{j:t_j=x} \lambda^2 \sum_{u \in \Sigma^{n-1}} \sum_{i:s[i]=u} \sum_{1:t[1]=u, l_{n-1}<j} \lambda^{|s|-i_1+1}\lambda^{j-1-l_1+1}$$

It is noted that the part of the second term in the equation [2] within the three innermost sums looks quite similar to the definition of the string kernel for sequences of length n−1, although the contribution decays over $|s|-i_1+1$ and $j-1+l_1+1$ rather than $i_n - i_1 + 1$ and $l_n - l_1 + 1$ as set forth in the string kernel in equation [1]. Defining:

$$K'_{n-1}(s, t) = \sum_{u \in \Sigma^{n-1}} \sum_{i:u=s[i]} \sum_{j:u=t[j]} \lambda^{|s|-i_1+1}\lambda^{|t|-j_1+1},$$

then equation [2] can be rewritten as:

$$K_n(sx, t) = K_n(s, t) + \sum_{j:t_j=x} \lambda^2 K'_{n-1}(s, t[1:j-1]),$$

where t[1:j−1] refers to the first j−1 symbols of t. Intuitively, $K'_{n-1}(s,t)$ counts matching subsequences of n−1 symbols, but instead of discounting them according to the length of the window they span as in $K_{n-1}(s,t)$, it discounts them according to the distance from the first symbol in the subsequence to the end of the complete sequence.

It follows that the values of $K'_n$ can be calculated using the following recursive equation:

$$K'_{n-1}(sx, t) = \sum_{u \in \Sigma^n} \sum_{i:u=s[i]} \sum_{j:u=t[j]} \lambda^{(|s|+1)-i_1+1}\lambda^{|t|-j_1+1} + \quad [3]$$

$$\sum_{u \in \Sigma^n} \sum_{i:v=s[i]} \sum_{j:t_j=x} \sum_{1:t[j]=v, j_{i-1}<j} \lambda^{(|s|+1)-i_1+1}\lambda^{|t|-j_1+1}$$

$$= \lambda \sum_{u \in \Sigma^n} \sum_{i:u=s[i]} \sum_{j:u=t[j]} \lambda^{|s|-i_1+1}\lambda^{|t|-j_1+1} +$$

$$\sum_{j:t_j=x} \sum_{v \in \Sigma^{n-1}} \sum_{i:v=s[i]} \sum_{j:t[j]=v, j_{n-1}<j} \lambda^{|s|-i_1+1}\lambda^{(j-1)-j_1+1}\lambda^{|t|-j+2}$$

$$= \lambda K'_n(s, t) + \sum_{j:t_j=x} K'_{n-1}(s, t[1:j-1])\lambda^{|t|-j+2}$$

B.3 Examples Using Recursive Formulation

In a first example, when computing $K'_2(s,t)$ using the alphabet $\Sigma = \{A,C,G,T\}$ set forth in section B.1 above, the similarity between the sequence s (i.e., s=CATG) and t (t=ACATT) is measured for all subsequences (i.e., features) of length n=2. The computation of $K'_i$ is similar to $K_i$ in the example set forth in section B.1 above, except that the computation of $K'_i$ common subsequences is discounted according to the distance from the first matching symbol of the sequence to the last symbol of the sequence, instead of discounting common subsequences according to the distance from the first matching symbol of the sequence to the last matching symbol of the sequence. In this first example, the nonzero subsequences u of the vectors for s and t in the feature space would then be as set forth in Table 2.

TABLE 2

| u | s | t |
|---|---|---|
| AA | 0 | $\lambda^5$ |
| AC | 0 | $\lambda^5$ |
| AG | $\lambda^3$ | 0 |
| AT | $\lambda^3$ | $2\lambda^3 + 2\lambda^5$ |
| CA | $\lambda^4$ | $\lambda^4$ |
| CC | 0 | 0 |
| CG | $\lambda^4$ | 0 |
| CT | $\lambda^4$ | $2\lambda^4$ |
| GA | 0 | 0 |
| GC | 0 | 0 |
| GG | 0 | 0 |
| GT | 0 | 0 |
| TA | 0 | 0 |
| TC | 0 | 0 |
| TG | $\lambda^2$ | 0 |
| TT | 0 | $\lambda^2$ |

For instance as set forth in Table 2, the value for the feature u=CT for the sequence t=ACATT is $2\lambda^4$ (i.e., $\lambda^4+\lambda^4$) because both occurrences of CT start on the second symbol C which is four symbols away from the end of the sequence t. Hence:

$$K'_2(CATG, ACATT) = \lambda^3(2\lambda^3+2\lambda^5) + \lambda^4\lambda^4 + \lambda^4(2\lambda^4) = 2\lambda^6 + 5\lambda^8.$$

Figure 4:
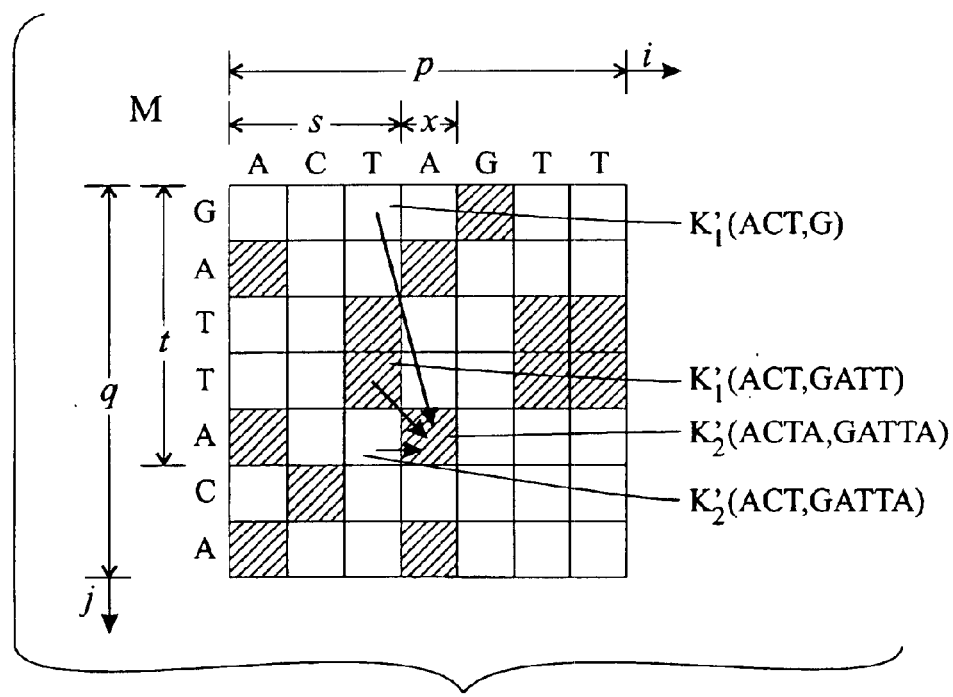
FIG. 4 illustrates recursion used for computing the similarity between the sequences of symbols p=GATTACA and q=ACTAGTT.

In another example, FIG. 4 illustrates recursion used for calculating the similarity between the sequence of symbols p=GATTACA and q=ACTAGTT. Given the two sequences of symbols p and q, a binary matrix M can be defined such that:

$$M_{ij} \begin{cases} 1 & \text{if } p_i = q_j \\ 0 & \text{otherwise.} \end{cases}$$

The value $K'_n(sx,t)$ (e.g., $K'_2(ACTA,GATTA)$ in FIG. 4) counts the number of matches of sequences of length n (e.g., n=2 in FIG. 4) appropriately discounted from the first element of the match to the end of the two sequences. In the example shown in FIG. 4, two subsequence matches are taken into account by the term $K'_2(ACT,GATTA)$ (i.e., a first is given by $<p_1=q_2=A(M_{12}), p_3=q_3=T(M_{33})>$, and a second given by $<p_1=q_2=A(M_{12}), p_3=q_4=T(M_{34})>$), appropriately discounted by $\lambda$ for the additional distance to the end of the sequence sx caused by the final x=A. In addition, three more subsequence matches, appropriately discounted as well, are taken into account by the term $K'_1(ACT,GATT)$ (i.e., a first is given by $<p_1=q_2=A(M_{12}), p_4=q_5=A(M_{45})>$, a second is given by $(p_3=q_2=T(M_{32}), p_4=q_5=A(M_{45})>$, and a third given by $<p_3=q_4=T(M_{34}), p_4=q_5=A(M_{45})>)$. It is noted that the contribution of the term $K'_1(ACT,G)$ is null, as none of the symbols in ACT matches the symbol G.

Intuitively, $K'_{n-1}(s,t)$ is used by the recursive equation [3] to store, as an intermediate result, the total discounted "mass" of matches of length n−1 ready to be turned into matches of length n should the next symbol in s match some of the symbols in t. This "mass" is propagated according to the recursive equation [3]. In terms of the matrix shown in FIG. 4, this means that values of $K'_n$ are percolated from left to right along the rows, discounting them by an additional $\lambda$ for each new step. Moreover, if the position at which the value is computed corresponds itself to a symbol match, then the value is accrued by the masses of sequences of length n−1 stored in the immediate previous column and in the rows from one to one less than the current position.

B.4 Extended Recursive Formulation

To summarize, the recursive formulation in section B.2 is given by the following equations:

$$K_n(sx, t) = K_n(s, t) + \sum_{j:t_j=x} \lambda^2 K'_{n-1}(s, t[1:j-1]) \quad [4]$$

$$K'_i(sx, t) = \lambda K'_i(s, t) \sum_{j:t_j=x} K'_{i-1}(s, t[1:j-1])\lambda^{|t|-j+2}, \quad [5]$$

$$(i = 1, \ldots, n-1)$$

which has base values defined as:

$K'_0(s,t)=1$, for all $s,t$ $K'_i(s,t)=0$, if $\min(|s|,|t|)<i$, ($i=1,\ldots,n-1$)

$K_n(s,t)=0$, if $\min(|s|,|t|)<n$.

The time required to compute the string kernel using the recursive equations [4] and [5] is given by $O(n|s||t|^2)$. This can be seen by observing that the outermost recursion is for increasing values of subsequence lengths (i=1, ..., n−1), and that for each length and each additional symbol in s and in t, a sum over the whole prefix of t up to the position being considered is required.

This recursive formulation for computing the string kernel defined by equations [4] and [5], although significantly more efficient than the formulation defined by equation [1], can be further improved by observing that the sum component in the evaluation of the recursive equation [5] (i.e., $K'_i(sx,t)$) can also be computed incrementally. That is, the complexity can be reduced by storing intermediate values of the sum of the recursive equation [5]. Another recursive equation may thus be defined as:

$$K''_i(sx, t) = \sum_{j:t_j=x} K'_{i-1}(s, t[1:j-1])\lambda^{|t|-j+2} \quad (i=1,\ldots,n-1),$$

which has base values defined as:

$K''_0(s,t)=0$, for all $s,t$ $K''_i(s,t)=0$, if $\min(|s|,|t|)<i$, ($i=1,\ldots,n-1$).

Intuitively, the recursive equation $K''_i(sx,t)$ stores the sum of the discounted masses of matches of subsequences of length i−1 ending somewhere in the column just before the one being considered in the matrix and in some previous row. It follows that:

$$K''_i(sx, ty) = \sum_{j:t_j=x} K'_{i-1}(s, t[1:j-1])\lambda^{(|t|+1)-j+2} \quad [6]$$

$$= \lambda K''_i(sx, t) \qquad (\text{if } x \neq y)$$

$$K''_i(sx, tx) = \sum_{j:t_j=x} K'_{i-1}(s, t[1:j-1])\lambda^{(|t|+1)-j+2} + \quad [7]$$

$$K''_i(sx, t)\lambda^{(|t|+1)-(|t|+1)+2}$$

$$= \lambda K''_i(sx, t) + \lambda^2 K'_{i-1}(s, t) \qquad (\text{otherwise})$$

The recursive equations [6] and [7] can be rewritten together as:

$$K''_i(sx, ty) = \begin{cases} \lambda(K''_i(sx, t) + \lambda K'_{i-1}(s, t)) & \text{if } x = y \\ \lambda K''_i(sx, t) & \text{otherwise} \end{cases} \quad [8]$$

The recursive equation for $K'_i(sx,t)$ can thus be expressed as a function of $K''$ as:

$$K'_i(sx,t) = \lambda K'_i(s,t) + K''_i(sx,t) \quad (i=1,\ldots,n-1) \quad [9]$$

By introducing $K''$, a single sum for updating $K''$ is sufficient for each new element s and t, instead of a sum over all values for $J:t_j=x$. The overall time complexity for computing the string kernel using these equations thus reduces to $O(n|s||t|)$.

B.5 Summary Of Extended Recursive Formulation

The measure of similarity $K_n$ that matches subsequences of symbols of length n between a first sequence of symbols and a second sequence of symbols, where the measure of similarity $K_n$ is a first recursive equation (set forth above as equation [4]), is given by:

$$K_n(sx, t) = K_n(s, t) + \sum_{j:t_j=x} \lambda^2 K'_{n-1}(s, t[1:j-1]), \text{ where}$$

n: is a subsequence length,
$K_n$: is the measure of similarity for subsequences of length n,
s: is any sequence of symbols,
t: is any other sequence of symbols,
sx: is the sequence of symbols obtained by appending the symbol x to the end of the sequence of symbols s,
$\lambda$: is a decay factor for penalizing matching subsequences that are noncontiguous ($0 \leq \lambda \leq 1$);
$t[1:j-1]$: refers to the first j-1 symbols of t, $$\sum_{j:t_j=x}:$$

is a sum that ranges over all indices j such that $t_j$ (i.e., the $j^{th}$ symbol of t) is x,
K': is a function defined by a second recursive equation (set forth above as equation [9]) given by:

$$K'_i(sx,t) = \lambda K'_i(s,t) + K''_i(sx,t) \quad (i=1,\ldots,n-1), \text{ and}$$

K'': is a function defined by a third recursive equation (set forth above as equation [8]) given by:

$$K''_i(sx, ty) = \begin{cases} \lambda(K''_i(sx, t) + \lambda K'_{i-1}(s, t)) & \text{if } x = y \\ \lambda K''_i(sx, t) & \text{otherwise.} \end{cases}$$

The base values for the recursive equations [4] and [8] are defined as:

$K''_0(s,t)=0$, for all $s,t$ $K''_i(s,t)=0$, if $\min(|s|,|t|)<i$, $(i=1,\ldots,n-1)$ $K'_0(s,t)=1$, for all $s,t$, $K'_i(s,t)=0$, if $\min(|s|,|t|)<i$, $(i=1,\ldots,n-1)$ $K_n(s,t)=0$, if $\min(|s|,|t|)<n$, where $|s|$ is the cardinality of s, and $|t|$ is the cardinality of t.

C. Direct Computation of the Recursive Formulation

In one embodiment, the recursive computation of the string kernel defined by the recursive equations [4], [9], and [8] set forth in section B.5 is implemented directly (herein referred to as "the direct method"). FIG. 5 sets forth pseudo code depicting computational operations (e.g., carried out by processor 116 in FIG. 1) of the direct method for performing the recursive computation (i.e., Direct(s,t,$\lambda$,N) returns $K_N$(s, t)).

The direct method represents intermediate results using three-dimensional matrices, and computes the matrices for K' and K'' layer after layer following a path parallel to the edges within each layer. This computational order requires that a full layer for each structure be stored in memory at any given time, thus leading to memory requirements proportional to the products of the lengths of the sequences. being evaluated.

More specifically, the direct method requires N arrays, each having the dimension $|s| \times |t|$, for storing the intermediate results of K' and K'' (e.g., in memory 118 while the processor 116 carries out instructions corresponding to the direct method in FIG. 5). Despite the adopted indexing convention, N arrays of dimensions $|s|$ are sufficient for storing the intermediate results of K. The space complexity of the direct method is therefore $O(N|s||t|)$.

Figure 6:
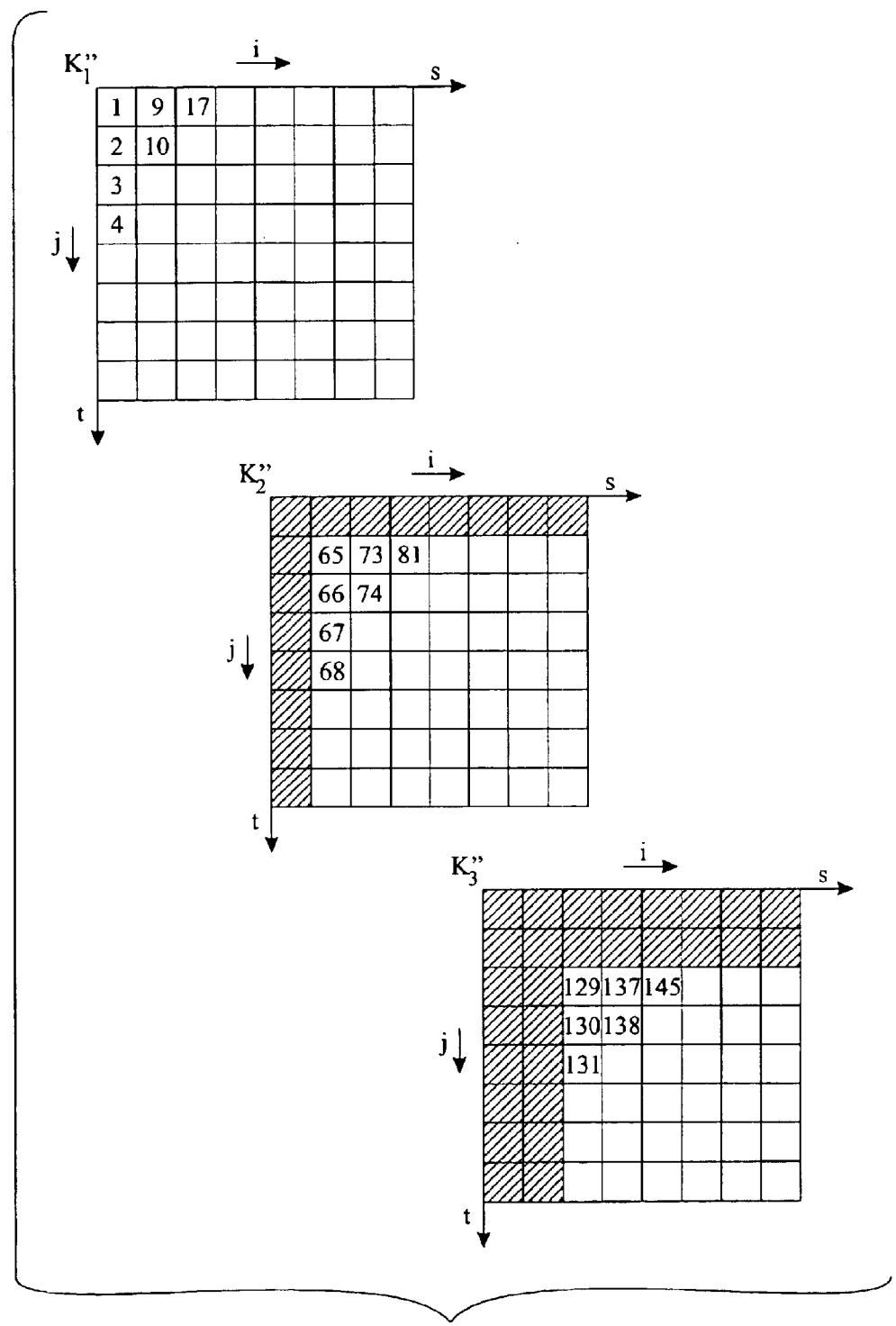
FIG. 6 illustrates the order in which the direct method shown in FIG. 5 computes values for K"

With specific reference now to K' and K'', FIG. 6 illustrates the order in which the direct method shown in FIG. 5 computes values for K'' (and K' similarly although not shown in the FIG. 6) when the length of the string s and t are both equal to eight and the subsequence length is n=3. More specifically, as depicted in FIG. 6 for $K''_1$, $K''_2$, and $K''_3$, three nested loops (i.e., an outer loop, a middle loop, and an inner loop) index over K' and K'' as follows:

(a) the outer loop performs computations for increasing subsequence length n, and (b) for each n, the middle loop performs computations for increasing prefixes of s, and (c) for each prefix of s, the inner loop performs computations for increasing prefixes of t.

The order in which the values for K' and K'' are computed can be defined by an integer function "ord" such that ord(n',i',j') is less than ord(n'',i'',j'') if and only if, whenever $K'_{n'}(i',j')$ and $K'_{n''}(i'',j'')$ are both computed $K'_{n'}(i',j')$ is computed before $K'_{n''}(i'',j'')$ (and similarly for K''). In the case of the direct computation, this integer function is given by (as shown for the example in FIG. 6):

$$ord_{direct}(n,i,j)=(n-1)(\max(|s|,|t|))^2+(i-n)\max(|s|,|t|)+j-n+1,$$

where (ij,n) defines a positions in the matrix $K'_n$ or $K''_n$, as shown in FIG. 6 for $K''_n$.

D. Diagonal Computation of the Recursive Formulation

Figure 7:
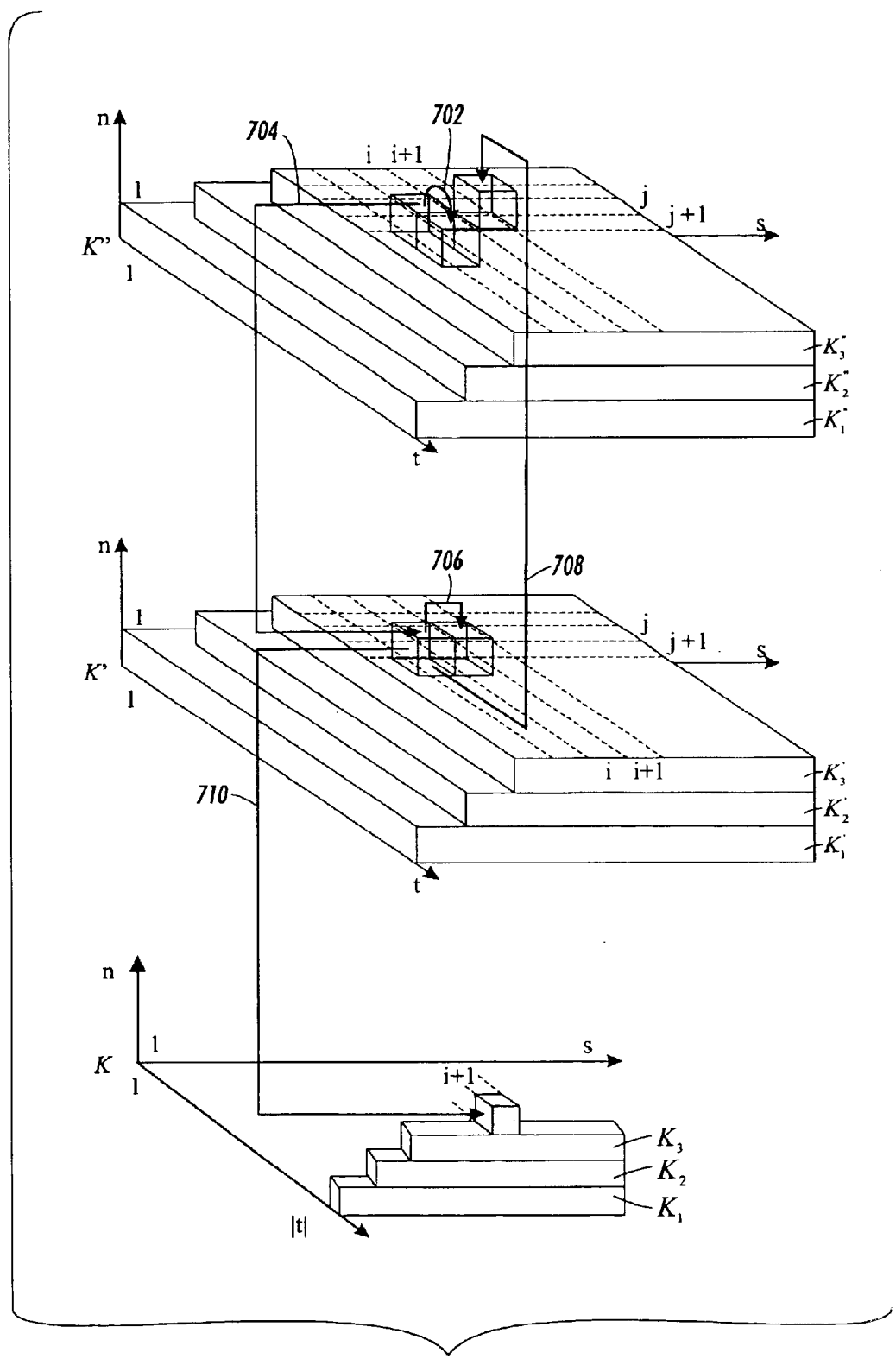
FIG. 7 illustrates data dependencies between K, K', and K" in the recursive formulation of the sequence kernel.

FIG. 7 illustrates the data dependencies between K, K', and K'' in the recursive formulation of the sequence kernel set forth in section B.5. Specifically, the data dependencies in FIG. 7 can be obtained by observing that $K''_n(i,j)$ is needed only when computing $K''_n(i,j+1)$ and $K'_n(i,j)$, as indicated by reference numbers 702 and 704 respectively. Once these computations have completed, there is no longer any need to store $K''_n(i,j)$ in memory. In addition, FIG. 7 shows that $K'_n(i,j)$ is needed only when computing $K'_n(i+1, j)$, $K''_{n+1}(i+1,j+1)$, and $K_{n+1}(i+1,|t|)$, as indicated by reference numbers 706, 708, and 710 respectively.

In another embodiment, the recursive computation of the string kernel defined by the recursive equations set forth in section B.5 is implemented using a more space efficient computational method (herein referred to as "the diagonal method"). FIG. 8 sets forth pseudo code depicting computational operations (e.g., carried out by processor 116 in FIG. 1) of the diagonal method for performing the recursive computation (i.e., Diagonal(s,t,λ,N) returns $K_N(s,t)$).

While the direct method set forth in FIG. 5 and the diagonal method set forth in FIG. 8 yield the same output (i.e., $K_N(|s|,|t|)$), the diagonal method computes values of the recursive equation [9] for K' and the recursive equation [8] for K" in a different order.

Figure 9:
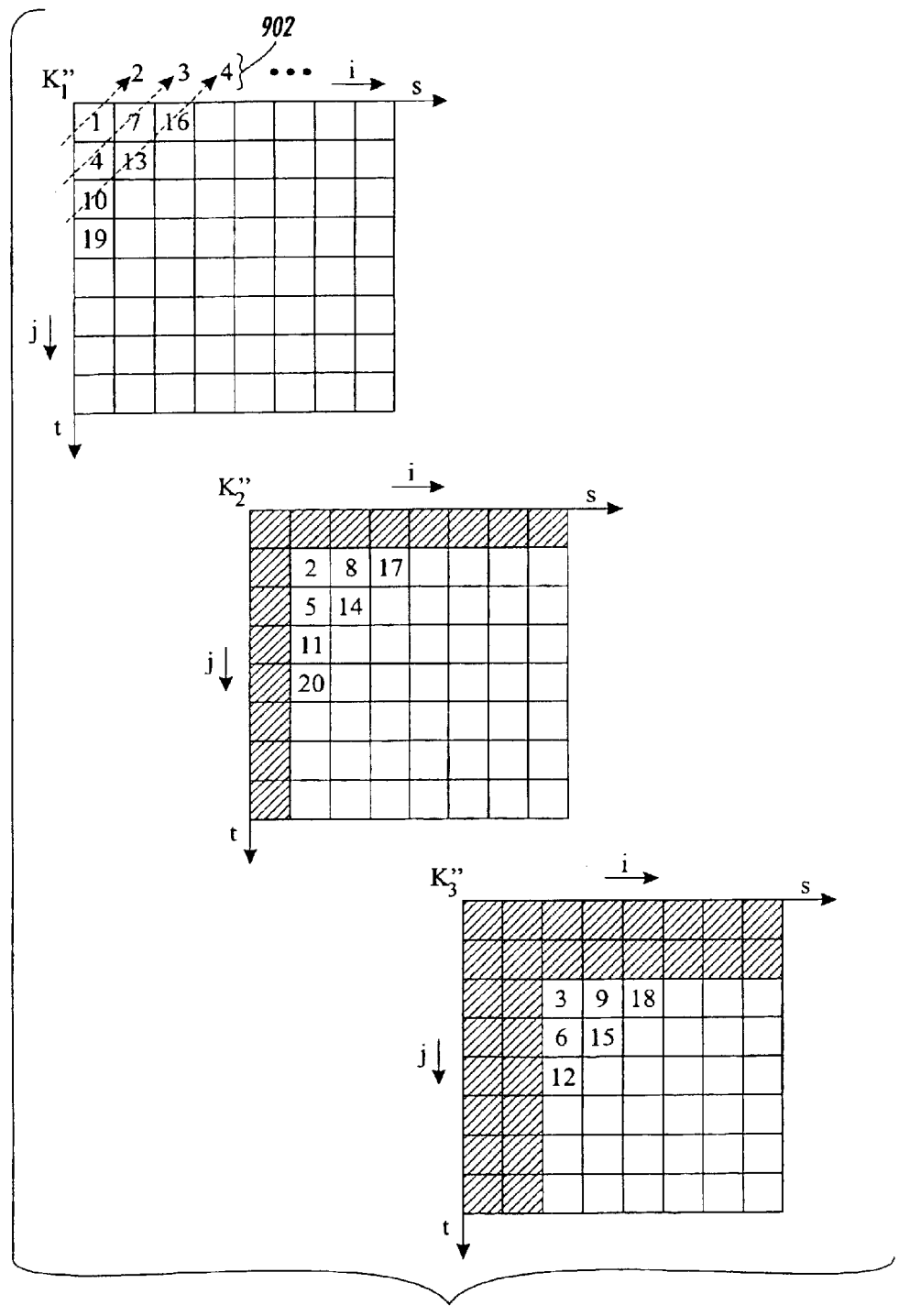
FIG. 9 illustrates the order in which the diagonal method shown in FIG. 8 computes values for K".

With specific reference now to K' and K", FIG. 9 illustrates the order in which the diagonal method shown in FIG. 8 computes values for K" (and K' similarly although not shown in the FIG. 9) when the length of the strings s and t are both equal to eight and the subsequence length is n=3. The computational order of the diagonal method (herein referred to as "the diagonal order") can be visualized intuitively as sweeping a diagonal across each of the matrices K' and K" shown in FIG. 9 and computing the values for all layers of $K''_1$, $K''_2$, and $K''_3$ at any given position before moving to the next position (e.g., see order $K''_1(1,1)$, $K''_2(2,2)$, and $K''_3(3,3)$, etc.).

In the direct method every value in K' and K" for a given subsequence length n is required for computing at least one value in K' and K" for subsequences of length n+1, and all values for length n are computed before any value for length n+1. Consequently, there must be sufficient memory for storing O(n|s||t|) values for each of K' and K" as set forth in the inner loop of the direct method shown in FIG. 5.

Advantageously, when the diagonal order is followed there is no longer a need for storing in memory O(n|s||t|) values for each of K' and K", as values can be "forgotten" as soon as they are no longer needed for any other recursive computation. More specifically, an array in memory of size n×|s| is sufficient for computing values for K" and an array in memory of size n×|t| is sufficient for computing values for K'. This can be seen in FIG. 8 for the partial values stored in memory for $K''_n(i)$ at 814 and 816 and for $K'_n(j)$ at 818.

The diagonal method proceeds as shown in FIG. 8 by initializing at 802 base values for K, K' and K". (The base values for K" in the example shown in FIG. 9 initialized at 802 are identified with hash marks.)

At 804 in FIG. 8, three nested loops (i.e., an outer loop 806, a middle loop 808, and an inner loop 810) index over K' and K" as follows:

(a) the outer loop performs computations for increasing sums of prefix lengths of s and t (identified in FIG. 9 as indices 902), and (b) for each sum of prefix lengths, the middle loop performs computations for increasing prefixes of s, and (c) for each prefix of s, the inner loop performs computations for increasing subsequence lengths n.

As set forth in the recursive equation [4], each intermediate value $K'_n(i,j)$ is also needed for computing $K_{n+1}(i+1,|t|)$. Following the diagonal computational order, it would be impossible to compute the values for $K_{n+1}(i+1,j)$ ($0 \leq j \leq |t|$) after having computed all the values of K', as many relevant values of K' would no longer be available. The structure of the recursive equation [4] suggests, however, that the values for $K_n(i,|t|)$ can be computed incrementally. Generally, an array in memory of size O(n×|s|) is sufficient for storing intermediate values for K that are computed incrementally.

Subsequently at 820, whenever indices i and j such that $s_i=t_j$ are met during the computation, $K_{n+1}(i+1)$ is incremented by $K'_n(i)$. Thus, at the end of the outer loop in the recursive computation, each $K_n(i,|t|)$ contains the value given by:

$$K_n(i, |t|) = \sum_{j:t_j=s_i} K'_{n-1}(i-1, t[1:j-1]).$$

Finally at 812, the $K_n(i,|t|)$ values are considered in turn for increasing values of i, and each one is multiplied by $\lambda^2$ and then incremented by the value of $K_n(i-1,|t|)$ computed immediately before. This ensures that eventually the value stored in each $K_n(i,|t|)$ is actually the one required by the recursive formulation.

Similar to the integer function $\text{ord}_{direct}$ given above for the direct computation, the integer function that provides a total ordering of the computation of values for K' and K" for the diagonal computation is given by (as shown for the example in FIG. 9):

$$\text{ord}_{diagonal}(n, i, j) = N\frac{(1+j-2n)(i+j-2n+1)}{2} + N(i-n) + n,$$

where (i,j,n) defines a positions in the matrix $K'_n$ or $K''_n$ for which N is the length of the largest subsequence length computed, as shown in FIG. 9 for $K''_n$.

To recapitulate with reference again to FIGS. 1, 2 and 8, the sequence similarity computation unit 138 computes a measure of similarity 214 between a first sequence of symbols and a second sequence of symbols received at 216. Memory 118 is allocated for the computational unit 118 for storing values that are computed using a recursive formulation, of which memory is allocated of size O((|s|+|t|)×n) for storing intermediate values of K, K', and K". In addition, memory 118 is allocated for storing processing instructions of the computational unit 138 (e.g., with functionality similar to that which is shown in FIG. 8) for carrying out the recursive formulation that computes the measure of similarity based on matching subsequences of symbols of length n between the first sequence of symbols having a length |s| and the second sequence of symbols having a length |t|. The processor 116 coupled to the memory 118 executes the processing instructions of computational unit 138.

The processor 118 in executing the processing instructions computes the values for the measure of similarity using the recursive formulation within which functions are computed using nested loops (as defined above in section B.5). An outer loop ranges over increasing sums of prefix lengths of the first sequence of symbols and the second sequence of symbols (e.g., as shown at 806 in FIG. 8). A middle loop ranges over increasing prefixes of the first sequence of symbols, for each sum of prefix lengths of the outer loop (e.g., as shown at 808 in FIG. 8). An inner loop ranges over increasing subsequence lengths, for each prefix of the first sequence of symbols of the middle loop (e.g., as shown at 810 in FIG. 8). The computed measure of similarity 214 is then output by the computation unit 138 to the information processing application 140.

E. Miscellaneous

The use of the terms "string" and "sequence of symbols" are used interchangeably herein to specify a concatenation of symbols (or symbol data). The symbols in a sequence of symbols may encode any set of terms including but not limited to: alphanumeric characters (e.g., alphabetic letters, numbers), symbols, words, lemmas, music notes or scores, biological or chemical formulations (e.g., amino acids or DNA bases), and kanji characters.

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

It will be appreciated that various other alternatives, modifications, variations, improvements or other such equivalents of the teachings herein that may be presently unforeseen, unappreciated or subsequently made by others are also intended to be encompassed by the claims.

What is claimed is:

1. A dynamic programming method for computing a measure of similarity between a first sequence of symbols and a second sequence of symbols, comprising:
    allocating memory for a computational unit for storing intermediate values that are computed using a recursive formulation that computes the measure of similarity based on matching subsequences of symbols between the first sequence of symbols and the second sequence of symbols;
    computing with a processor for the computational unit the intermediate values for the measure of similarity using the recursive formulation within which functions are computed following a computation order defined using nested loops that include:
        an outer loop with a first index that ranges over increasing sums of prefix lengths of the first sequence of symbols and the second sequence of symbols,
        a middle loop with a second index that ranges over increasing prefixes of the first sequence of symbols, for each sum of prefix lengths of the outer loop, and
        an inner loop with a third index that ranges over increasing subsequence lengths, for each prefix of the first sequence of symbols of the middle loop; and
    outputting the measure of similarity computed using the intermediate values.

2. The method according to claim 1, wherein the measure of similarity is output to an information processing application.

3. The method according to claim 2, wherein the information processing application uses the measure of similarity for performing one of information clustering, classification, cross-lingual information retrieval, routing, text comparison and filtering.

4. The method according to claim 2, wherein a first function of the recursive formulation is given by:

$$K_n(sx, t) = K_n(s, t) + \sum_{j:t_j=x} \lambda^2 K'_{n-1}(s, t[1:j-1]), \text{ where}$$

n: is a subsequence length,
$K_n$: is the measure of similarity for subsequences of length n,
s: is any sequence of symbols,
t: is any other sequence of symbols,
sx: is the sequence of symbols obtained by appending the symbol x to the end of the sequence of symbols t,
$\lambda$: is a decay factor for penalizing matching subsequences that are noncontiguous;
t[1:j−1]: refers to the first j−1 symbols of t, $$\sum_{j:t_j=x} :$$

is a sum that ranges over all indices j such that $t_j$ is x,
K': is a second function of the recursive formulation that is given by:

$$K'_i(sx,t)=\lambda K'_i(s,t)+K''_i(sx,t) \; (i=1,\ldots,n-1), \text{ and}$$

K″: is a third function of the recursive formulation that is given by:

$$K''_i(sx, ty) = \begin{cases} \lambda(K''_i(sx, t) + \lambda K'_{i-1}(s, t)) & \text{if } x = y \\ \lambda K''_i(sx, t) & \text{otherwise.} \end{cases}$$

5. The method according to claim 4, further comprising defining base values for the recursive formulation to be:

$K''_0(s,t)=0$, for all $s,t$ $K''_i(s,t)=0$, if $\min(|s|,|t|)<i$, $(i=1,\ldots,n-1)$ $K'_0(s,t)=1$, for all $s,t$, $K'_i(s,t)=0$, if $\min(|s|,|t|)<i$, $(i=1,\ldots,n-1)$ $K_n(s,t)=0$, if $\min(|s|,|t|)<n$, where
|s|: is the cardinality of s, and
|t|: is the cardinality of t.

6. The method according to claim 5, wherein the memory allocated for storing intermediate values of K' and K″ is sufficient for storing up to $(n\times|s|+n\times|t|)$ values in the memory.

7. The method according to claim 2, wherein ones of the matching subsequences of symbols are noncontiguous matches of symbols between the first sequence of symbols and the second sequence of symbols.

8. The method according to claim 7, wherein the noncontiguous occurrences of matching subsequences of symbols are penalized according to how many gaps exist between matching symbols.

9. The method according to claim 2, wherein the measure of similarity is computed for all possible subsequences of symbols between the first sequence of symbols and the second sequence of symbols.

10. An apparatus for computing a measure of similarity between a first sequence of symbols and a second sequence of symbols, comprising:
   a memory for storing: (a) intermediate values that are computed using a recursive formulation that computes the measure of similarity based on matching subsequences of symbols between the first sequence of symbols and the second sequence of symbols, and (b) processing instructions of a computational unit for carrying out the recursive formulation; and
   a processor coupled to the memory for executing the processing instructions of the computational unit; the processor in executing the processing instructions:
   computing the intermediate values for the measure of similarity using the recursive formulation within which functions are computed following a computation order defined using nested loops that include:
      an outer loop with a first index that ranges over increasing sums of prefix lengths of the first sequence of symbols and the second sequence of symbols,
      a middle loop with a second index that ranges over increasing prefixes of the first sequence of symbols, for each sum of prefix lengths of the outer loop, and
      an inner loop with a third index that ranges over increasing subsequence lengths, for each prefix of the first sequence of symbols of the middle loop; and
      outputting the meansure of similarity computed using the intermediate values.

11. The apparatus according to claim 10, further comprising an information processing application for receiving the measure of similarity from the computational unit.

12. The apparatus according to claim 11, wherein the information processing application uses the measure of similarity for performing one of information clustering, classification, cross-lingual information retrieval, routing, text comparison and filtering.

13. The apparatus according to claim 11, wherein a first function of the recursive formulation is given by:

$$K_n(sx, t) = K_n(s, t) + \sum_{j: t_j = x} \lambda^2 K'_{n-1}(s, t[1:j-1]), \text{ where}$$

n: is a subsequence length,
$K_n$: is the measure of similarity for subsequences of length n,
s: is any sequence of symbols,
t: is any other sequence of symbols,
sx: is the sequence of symbols obtained by appending the symbol x to the end of the sequence of symbols t, λ: is a decay factor for penalizing matching subsequences that are noncontiguous;
t[1:j−1]: refers to the first j−1 symbols of t, $$\sum_{j: t_j = x} :$$

is a sum that ranges over all indices j such that $t_j$ is x,
K': is a second function of the recursive formulation that is given by:

$$K'_i(sx, t) = \lambda K'_i(s, t) + K''_i(sx, t) \ (i=1, \ldots, n-1), \text{ and}$$

K": is a third function of the recursive formulation that is given by:

$$K''_i(sx, ty) = \begin{cases} \lambda(K''_i(sx, t) + \lambda K'_{i-1}(s, t)) & \text{if } x = y \\ \lambda K''_i(sx, t) & \text{otherwise.} \end{cases}$$

14. The apparatus according to claim 13, wherein base values for the recursive formulation are defined to be:

$K''_0(s,t)=0$, for all $s,t$ $K''_i(s,t)=0$, if $\min(|s|,|t|)<i$, $(i=1, \ldots, n-1)$ $K'_0(s,t)=1$, for all $s,t$, $K'_i(s,t)=0$, if $\min(|s|,|t|)<i$, $(i=1, \ldots, n-1)$ $K_n(s,t)=0$, if $\min(|s|,|t|)<n$, where
   |s|: is the cardinality of s, and
   |t|: is the cardinality of t.

15. The apparatus according to claim 14, wherein the memory allocated for storing intermediate values of K' and K" is sufficient for storing up to (n×|s|+n×|t|) values in the memory.

16. The apparatus according to claim 11, wherein ones of the matching subsequences of symbols are noncontiguous matches of symbols between the first sequence of symbols and the second sequence of symbols, and the noncontiguous occurrences of matching subsequences of symbols are penalized according to how many gaps exist between matching symbols.

17. The apparatus according to claim 11, wherein the measure of similarity is computed for all possible subsequences of symbols between the first sequence of symbols and the second sequence of symbols.

18. An article of manufacture for use in a machine comprising:
   a) a memory;
   b) instructions stored in the memory for computing a measure of similarity between a first sequence of symbols and a second sequence of symbols comprising:
   allocating memory for a computational unit for storing intermediate values that are computed using a recursive formulation that computes the measure of similarity based on matching subsequences of symbols between the first sequence of symbols and the second sequence of symbols;
   computing for the computational unit with a processor the intermediate values for the measure of similarity using the recursive formulation within which functions are computed following a computation order defined using nested loops that include:
- an outer loop with a first index that ranges over increasing sums of prefix lengths of the first sequence of symbols and the second sequence of symbols,
- a middle loop with a second index that ranges over increasing prefixes of the first sequence of symbols, for each sum of prefix lengths of the outer loop, and
- an inner loop with a third index that ranges over increasing subsequence lengths, for each prefix of the first sequence of symbols of the middle loop; and outputting the measure of similarity computed using the intermediate values.

19. The article of manufacture according to claim 18, wherein the measure of similarity is output to an information processing application that uses the measure of similarity for performing one of information clustering, classification, cross-lingual information retrieval, routing, text comparison and filtering.

20. The article of manufacture according to claim 19, wherein a first function of the recursive formulation is given by:

$$K_n(sx, t) = K_n(s, t) + \sum_{j:t_j=x} \lambda^2 K'_{n-1}(s, t[1:j-1]), \text{ where}$$

n: is a subsequence length, $K_n$: is the measure of similarity for subsequences of length n, s: is any sequence of symbols, t: is any other sequence of symbols, sx: is the sequence of symbols obtained by appending the symbol x to the end of the sequence of symbols t, $\lambda$: is a decay factor for penalizing matching subsequences that are noncontiguous;

t[1:j−1]: refers to the first j−1 symbols of t, $$\sum_{j:t_j=x}:$$

is a sum that ranges over all indices j such that $t_j$ is x,

K': is a second function of the recursive formulation that is given by:

$$K'_i(sx,t) = \lambda K'_i(s,t) + K''_i(sx,t) \; (i=1,\ldots,n-1), \text{ and}$$

K'': is a third function of the recursive formulation that is given by:

$$K''_i(sx, ty) = \begin{cases} \lambda(K''_i(sx, t) + \lambda K'_{i-1}(s, t)) & \text{if } x = y \\ \lambda K''_i(sx, t) & \text{otherwise;} \end{cases} \text{ and}$$

wherein base values for the recursive formulation are defined to be:

$K''_0(s,t)=0$, for all $s,t$ $K''_i(s,t)=0$, if $\min(|s|,|t|)<i$, $(i=1,\ldots,n-1)$ $K'_0(s,t)=1$, for all $s,t$, $K'_i(s,t)=0$, if $\min(|s|,|t|)<i$, $(i=1,\ldots,n-1)$ $K_n(s,t)=0$, if $\min(|s|,|t|)<n$, where

|s|: is the cardinality of s, and

|t|: is the cardinality of t.

21. The article of manufacture according to claim 20, wherein the memory allocated for storing intermediate values of K' and K'' is sufficient for storing up to (n×|s|+n×|t|) values in the memory.

* * * * *